Nov. 1, 1966   E. J. SIMONE   3,281,975
CALENDAR WITH LETTER WEIGHING MEANS
Filed March 30, 1964   2 Sheets-Sheet 2
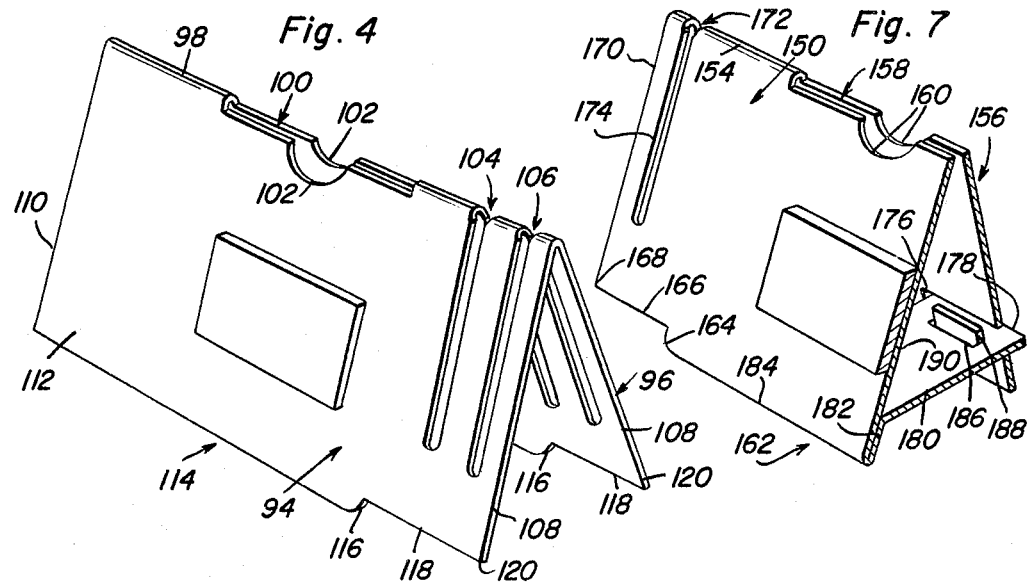
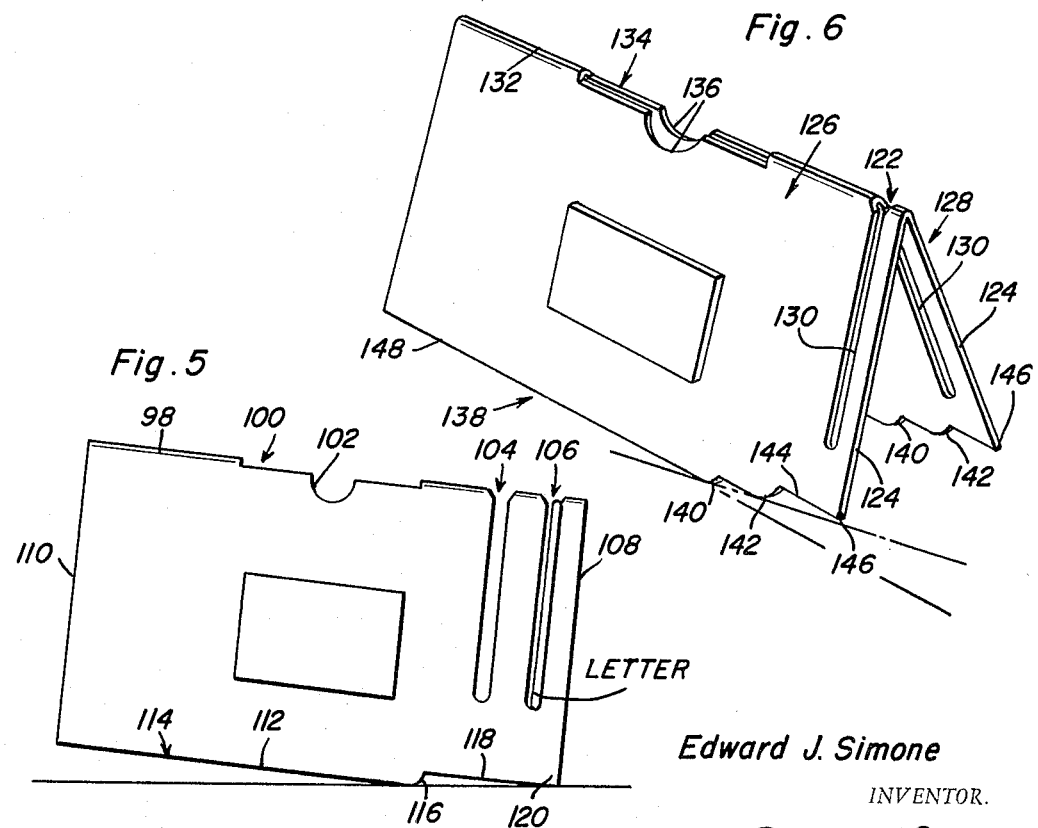
Edward J. Simone
INVENTOR.
BY Clarence A. O'Brien
and Harvey B. Jacobson
Attorneys

United States Patent Office 3,281,975
Patented Nov. 1, 1966

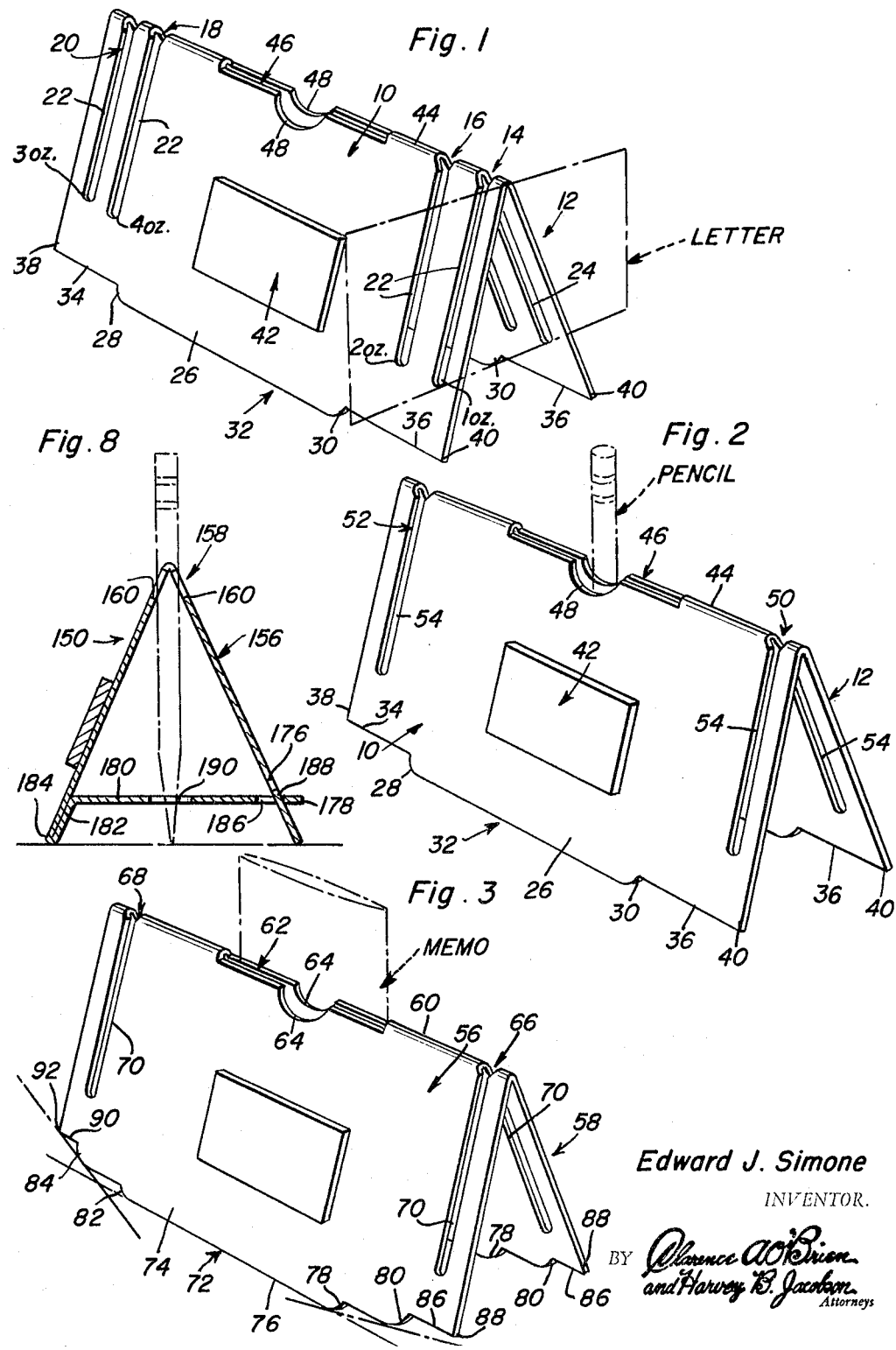

3,281,975
CALENDAR WITH LETTER WEIGHING MEANS
Edward J. Simone, 7851 General Sheridan Lane,
Affton, Mo.
Filed Mar. 30, 1964, Ser. No. 355,708
11 Claims. (Cl. 40—120)

This invention relates, broadly construed, to portable letter weighing devices primarily for home and office use and, more particularly, has to do with a multipurpose desk-type calendar; that is, a calendar which is unique in that it embodies novel letter weighing means, available surface space for display advertising, practical holding means for a pencil or pen, and holding means for written messages and memos or the like.

The principal object of the herein disclosed innovation is to provide a simple, economical self-standing calendar which is compact and convenient and which (with or without calendar media) offers the user self-supporting letter-holding and weighing facilities devoid of counterweights, springs and other balancing expediences. In fact, the invention provides an adaptation wherein selectively and collectively usable facilities are incorporated in a self-contained manner, whereby to obviate the need for separate and movable component parts which soon get out of order or are otherwise difficult to cope with.

In carrying out the inventive concept the calendar or equivalent easel-like support means employs at least one panel, a front panel which is maintained in the desired upstanding or erect position by prop means, for example, a second panel. Two like panels, front and back, are preferred and the upper coinciding lengthwise edges are joined by a connecting fold. When the two panels are set up for use they slope downwardly and outwardly and define a support which is V-shaped or triangular in end elevation. The lower or bottom edges embody novel fulcrum means which is so constructed and arranged that at least one end of the calendar is capable of tilting, whereby to provide a simple but effective weighing scale. To the ends desired at least one end portion, the tiltable end here, is provided with slot means providing one or more letter-receiving and retaining slots. Accordingly, by inserting a ready-to-weigh letter in a chosen slot, the desired tilting and weighing step is had and when the letter is removed the panels are self-righted and restored to their normal horizontal positions.

It is within the purview of the invention to provide the aforementioned dual panel support or calendar with one weighing slot at each end, one slot at one end only, or paired slots at one or both ends. The individual slot or slots are of requisite depth and of predetermined width and will be suitably marked for handling letters weighing from one ounce (1 oz.) and progressively up to four ounces (4 oz.) thus providing the diversified range of usage desired.

The aforementioned fold is novel in that the central or median portion has an elongated horizontal slot for insertion and retention of notes, memos or important papers. Then, too, the edges of the memo slot are formed with registrable notches which conjointly provide a hole which serves as a holder of pencils, pens or the like.

Further, the panels can be and optionally are connected in spaced-apart relationship by a tongue-like tab which is carried by the bottom of the front panel and is separably connected with retaining means provided therefor at the bottom of the back panel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a multipurpose calendar constructed in accordance with the present invention, readied for use and showing the form of the invention having four selectively usable letter slots and coinciding fulcruming and tilting means;

FIGURE 2 is a view also in perspective and similar to FIG. 1 but with two slots only and showing the pencil holding means being used;

FIGURE 3 is a view in perspective showing a third embodiment of the overall concept with modified fulcruming means, two slots and showing the manner in which the memo holder or slot is employed;

FIGURE 4 is also a view in perspective showing a fourth modification with two letter slots at the tiltable right-hand end and fulcruming and tilting means adapted thereto;

FIGURE 5 is a view in front elevation based on FIG. 4 and showing how the inserted letter has tilted the "scale" for weighing purposes;

FIGURE 6 is also a view in perspective showing a slight modification in construction with single slot means and dual fulcrum points cooperable therewith;

FIGURE 7 is a view in perspective with a portion broken away and shown in section and which illustrates the panel interconnecting and retaining means; and FIGURE 8 is a view in section based on FIG. 7 and illustrating how the interconnecting means can, if desired, function as the part of the pencil holder.

By way of introduction to the detailed description it is to be pointed out that the term "calendar" is being used advisedly inasmuch as it may or may not be provided with a calendar pad, or an annual calendar plate imprinted or otherwise affixed. Also, advertising media or display data is optional. Then, too, the interlocking means (FIGS. 7 and 8) can and will vary in keeping with the manufacturer's option. Basically, however, the panel feature (at least one front panel supported by a prop—preferably a second or back panel) is generic to the various embodiments illustrated. To the ends desired one or more vertical die-cut slots are provided in the upper portions of the panels at their respective left and righthand ends, that is, left and right of the normally erect central portion. The slots are arranged and located where the weight of the letter or other mailable article will tilt the overall calendar in excess of one or more ounces (depending upon the slot used) due to location of the fulcrum point or points built into the lower or bottom portion of the front and back panels.

A comparison of FIG. 1 with the other views will show that, generically speaking, it embodies all of the essential features of the overall inventive concept. The support shown in FIG. 1 is of inverted V-shaped form in and elevation and constitutes the aforementioned "calendar." This calendar, and all other forms illustrated, can be made of cardboard, plastic materials, metal, wood or combinations thereof with or without the interlocking device (detailed in FIG. 7 and 8). Both panels are the same in construction and are preferably rectangular and the front panel is denoted at 10 and the easel or back panel is denoted at 12. The available areas or spaces can be appropriately designed and decorated or provided with display-type advertising media (not shown). Since this factor is applicable to the other embodiments to be described it need not be repeated. As is evident from some of the other views of the drawings slot means is provided and can be at one or both ends. In the instant adaptation one slot is denoted at the right at 14 (for one ounce letters) a second slot at 16 (for two ounce mail) a third slot 18 (for four ounce mail) and a fourth slot 20 at the lefthand end (for three ounce mail). Each slot has aligned cooperating portions 22 and 24 which together provide a complete slot of suitable depth for insertion and removal of the letter which is to be weighed preparatory to stamping and mailing the same. The slot portions 22 and 24 converge upwardly and the entrance or mouth is appropriately chamfered and enlarged to facilitate inserting the latter. The integral or built in fulcrum means preferably comprises a depending flap or extension 26 of requisite length having curved or rounded terminal portions which constitute spaced-apart fulcrum points 28 at the left and 30 at the right. This fulcrum means is denoted as an entity by the numeral 32. It is provided on both panels and accordingly the respective bottom edges or edge portions 34 and 36 are elevated above the desk or other supporting surface (not detailed). Consequently, the left and right corner portions 38 and 40 are tiltable in the manner shown, for example, in FIG. 5. It is evident, too, that the slots are confined to the tiltable end portions of the respective front and back panels 10 and 12. In other words, the slots 14 and 16 are directly above the tiltable edge and corner 36 and 40 and this is also true at the opposite end where the slots 18 and 20 are above the tiltable edge and corner portions 34 and 38. The numeral 42 designates the optional calendar pad. The coinciding junctional upper lengthwise or longitudinal edge portions of the two panels (where they converge upwardly) are joined by a web or fold 44 the median portion of which is provided with an elongated slot 46 of suitable length. This slot (see FIG. 3) can be used as a pocket, considered in conjunction with the panels, for temporary insertion and retention of a memo, special reminder or other paper or papers. The central portion of the slot has notches 48 which are semi-circular and which together provide a suitable opening or hole for insertion and removal of a pencil or a pen as suggested for example in FIG. 2.

It will be evident from FIG. 1 that the objective is to provide a self-supporting letter weighing device made from a single piece of material with one or more predetermined fixed fulcrums at points 28 and 30 for selective use. The slot portions 22 and 24 are sufficiently deep to permit effortless and positive insertion and engagement of the letters and similar matter to quickly and automatically indicate by tilting action the proper weight for postage purposes ranging from one and progressively to four ounces in the manner indicated. It follows that the device or calendar constitutes a simple and feasible combination letter-weighing scale, calendar and memo-pencil holder. By having described this particular embodiment of the invention in detail it will be unnecessary, it is submitted, to describe the other embodiments or forms with equal particularity. For example, in FIG. 2 the only difference is that instead of having four slots only two slots are employed. The slot 50 at the right and the slot 52 at the left have downwardly diverging or upwardly converging companion slot portions 54 which coordinate in providing the desired result. Except for the difference in slots this embodiment is the same as that described in FIG. 1 and therefore the same reference numerals are applied to like parts. It may be added, however, that in this illustration the pencil is shown fitting into the cutouts or notches 48.

FIGURE 3 discloses a modification and extension of the form or embodiment illustrated in FIG. 2. Here the front panel is rectangular and is denoted by the numeral 56 and the companion back panel by the numeral 58, the upper converging ends being interconnected by a folding web 60 having a horizontally elongated slot 62 and pencil accommodating cutouts or notches 64. The slot 60 is shown with the insertable memo pocketed therein. The slots at the right and left are denoted at 66 and 68, respectively, and have suitably elongated cooperating slot portions 70. So far it will be evident that this construction is much the same as that illustrated in FIG. 2 and the principal difference resides in the fulcrum means on the lower edge of each panel 56 or 58 as the case may be. The means corresponds and is denoted generally by the numeral 72. Here a stepped construction in cutting out the bottom edge of the panel is followed and the delineation provides a central flap-like portion 74 with its normal calendar supporting and righting edge denoted at 76. The fulcrum points at the right are denoted at 78 and 80, respectively, and those at the left by the numerals 82 and 84, respectively. The tiltable edge and corner portions are denoted at 86 and 88 at the right and 90 and 92 at the left. This description applies to both front and back panels 56 and 58 as is evident.

With reference now to the embodiment illustrated in FIGS. 4 and 5 the concept is basically the same but there are slight and specific differences. The front panel is denoted at 94, the back panel at 96, the upper converging ends being integrated by a junctional fold 98. This fold is provided intermediate its ends with an elongated horizontal slot 100 for an insertable paper such as the memo illustrated in FIG. 3. The coordinating cutouts or notches 102 provide the pencil holder. In this adaptation there are two slots 104 and 106 adjacent the vertical righthand end portions or edges 108 of the panels. There are no slots at the opposite ends 110. However, the major lower edge portions here at 112 provide the fulcrum means 114 which more specifically includes a rounded terminal end 116 which constitutes a single fulcrum point for both parts 104 and 106. The elevated edge portion is denoted at 118 and the tiltable companion corner portion is denoted at 120. The operation and use of this construction is illustrated in FIG. 5.

The modification illustrated in FIG. 6 is much the same as that just described; that is, FIGS. 4 and 5. In this adaptation or embodiment a single slot 122 is adjacent the vertical ends 124 of the front and back panels 126 and 128, respectively. The deep slot portions in the panels are denoted at 130 and are adjacent and parallel to the ends or edges 124 and are above the tiltable end of the overall calendar. The junctional web or fold is at the coinciding upper converging ends of the panels and is denoted at 132 and is provided centrally with an elongated memory slot 134 having cooperating cutouts or notches 136 providing the aforementioned pencil holder. Here the fulcrum means on each panel is denoted generally at 138 and is different only in that instead of the single fulcrum points 116 in FIGS. 4 and 5 dual and selectively usable rounded portions or fulcrum points are provided at 140 and 142, respectively. The elevated tiltable edge portion is denoted at 144 and the cooperating limit stop corner is denoted at 146. The main calendar supporting edge, the longitudinal edge portion proper is denoted at 148.

FIGS. 7 and 8 are considered together but are not treated as a separate embodiment of the invention inasmuch as the means disclosed therein can be incorporated in any of the embodiments already described. Briefly, the front panel 150 is joined by a fold or web 154 with the companion back panel 156, the fold being provided with an elongated horizontal slot 158 and complemental cutouts or notches 160. The fulcrum means is denoted at 162 and the fulcrum point at the left at 164 defining an elevated bottom edge portion 166 and a tiltable corner portion 168 adjacent the end 170 having the slot 172 therein, the slot portions of the back panel is provided with a slot 176 for the free end portion 178 of the tongue or tab 180 integrally joined at 182 to the bottom 184 of the fulcrum means 162. The end portion 178 has a keeper slot 186 therein to receive the keeper tongue 188. The hole 190 at the center of the tab cooperates with the aforementioned cutouts 160 in providing a pencil holder in the manner brought out in FIG. 8.

The invention features die-cut or formed blanks providing the desired slotted weighing scale, calendar pad support means and affords several useful features, postal scale, calendar and memo or pen and pencil holder. There are no removable or movable parts and the featured improvements are viewable and instantly usable for the purposes desired. Insertion of the letter in the deep slot gives weight instantly in ounces for postal purposes depending on the slot or slots used.

The invention, generically and specifically construed, serves the purposes for which it is intended and a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A desk calendar embodying self-standing portable support means including at least one upstanding self-righting panel having means adapted to support a calendar and fixed fulcrum means permitting the panel to tilt in a given manner and direction and also having slot means, said slot means embodying at least one slot for temporary reception and retention of an insertable and removable letter which is to be weighed.

2. For use in the home, office or elsewhere, a portable self-standing desk-type calendar embodying at least one self-righting bodily tiltable panel having selectively usable slot means and fulcrum means, the latter being fixedly embodied in a lower portion of said panel, said panel being generally rectangular in plan, said slot means embodying at least one slot, the latter located adjacent one end portion of said panel and being of a predetermined width and depth dimension for reception of a ready-to-weigh letter.

3. The structure according to claim 2, and wherein said slot means also includes a second slot for temporary reception and storage of small articles, for example, a note, a pencil or the like.

4. A desk calendar comprising at least one planar panel provided with means for supporting the panel in an upright position atop said desk, said panel having at least one letter receiving slot open at one end and closed at its other end, the bottom edge of said panel having a portion thereof elevated above the plane of the desk surface, and having another portion embodying panel-tilting fulcrum means, said slot being disposed at right angles to and aligned and cooperable with said elevated bottom edge, whereby when a letter is placed in said slot the entire panel is caused to tilt down and subsequently to right itself after the letter is removed.

5. A desk calendar comprising companion front and back panels having coplanar lower longitudinal edges adapted to reside firmly atop the desk surface, the upper longitudinal edges of said panels being joined by an integrating fold whereby the panels can slope outwardly and downwardly when in use, said lower edges having fixed fulcruming means, and corresponding end portions of said panels at one end of said calendar being vertically slotted and the resultant slots being aligned and conjointly functioning to retentively receive and removably hold a letter which is to be weighed preparatory to placing the required postage thereon.

6. The structure defined in claim 5, and wherein the median portion of said panel-connecting fold is provided with an elongated slot with median portions of the slot's edges provided with registering notches.

7. A desk calendar comprising companion front and back panels having coplanar lower longitudinal edges adapted to reside firmly atop the desk surface, the upper longitudinal edges of said panels being joined by an integrating fold whereby the panels can slope outwardly and downwardly when in use, said lower edges having fixed fulcruming means, said fulcruming means embodying a plurality of selectively usable individual fulcrum points all spaced inwardly from the respective vertical end portions of said panels, and the respective end portions having letter slots, said slots being disposed outwardly of their respectively cooperating fulcrum points.

8. The structure defined in claim 7 and, in combination, means for separably interconnecting the panels and adapted to retain the same in relatively fixed relationship and to assist in providing the desired easel-like upright position of the complete calendar.

9. The structure according to claim 8, and wherein said interconnecting means comprises a locking tongue carried by a median bottom portion of the front panel, said tongue having a free end extending through a slot provided therefor in the rear panel, the latter slot having a keeper tab and said tab being releasably engageable with a keeper slot provided therefor in said tongue.

10. The structure according to claim 9 and wherein an intermediate portion of said tongue is provided with a hole for positioning and seating a pencil.

11. A desk calendar comprising companion front and back panels having coplanar lower longitudinal edges adapted to reside firmly atop the desk surface, the upper edges of said panels being joined by an integrating fold whereby the panels can slope outwardly and downwardly when in use, said lower edges having fixed fulcruming means, said means embodying individual fulcrums spaced inwardly from the respective vertical ends of said panels and elevating the lower edge portions which are situated outwardly of said individual fulcrums and allowing the end portions only of said panels to tilt downwardly toward either the lefthand or the righthand ends, respectively, of the overall calendar, pairs of vertically spaced parallel slots at each tiltable end portion of said panels, said slots each varying in size for selective letter weighing use and being confined to their tiltable but self-righting end portions.

References Cited by the Examiner
UNITED STATES PATENTS

| | | | |
|---|---|---|---|
| 98,453 | 12/1869 | Wight | 120—1 |
| 1,643,477 | 9/1927 | Warren | 120—1 |
| 2,767,497 | 10/1956 | Munson | 40—120 |

EUGENE R. CAPOZIO, *Primary Examiner.*

W. J. CONTRERAS, *Assistant Examiner.*